United States Patent
Beiler et al.

(10) Patent No.: US 10,636,262 B2
(45) Date of Patent: Apr. 28, 2020

(54) METHOD AND DEVICE FOR MONITORING INDIVIDUALS IN A PLACE EQUIPPED WITH DISTRIBUTED DETECTION MEANS

(71) Applicant: MORPHO, Issy-les-Moulineaux (FR)

(72) Inventors: Olivier Beiler, Issy-les-Moulineaux (FR); Pierre Escamilla, Issy-les-Moulineaux (FR); Stephane Gentric, Issy-les-Moulineaux (FR)

(73) Assignee: Idemia Identity & Security, Issy les Moulineaux (FR)

( * ) Notice: Subject to any disclaimer, the term of this patent is extended or adjusted under 35 U.S.C. 154(b) by 278 days.

(21) Appl. No.: 15/068,014

(22) Filed: Mar. 11, 2016

(65) Prior Publication Data
US 2016/0267758 A1    Sep. 15, 2016

(30) Foreign Application Priority Data
Mar. 13, 2015   (FR) ..................... 15 00507

(51) Int. Cl.
| | |
|---|---|
| G08B 13/196 | (2006.01) |
| G01S 5/16 | (2006.01) |
| G06T 7/292 | (2017.01) |
| G06N 7/00 | (2006.01) |
| G08B 25/00 | (2006.01) |
| G08B 31/00 | (2006.01) |

(52) U.S. Cl.
CPC .......... G08B 13/19641 (2013.01); G01S 5/16 (2013.01); G06N 7/005 (2013.01); G06T 7/292 (2017.01); G08B 13/19608 (2013.01); G08B 25/009 (2013.01); G08B 31/00 (2013.01); G06T 2207/30196 (2013.01); G06T 2207/30241 (2013.01)

(58) Field of Classification Search
CPC ..................................... G06T 7/00; G06K 9/00
See application file for complete search history.

(56) References Cited

FOREIGN PATENT DOCUMENTS

| | | |
|---|---|---|
| EP | 1 927 947 A1 | 6/2008 |
| FR | 2 943 878 A1 | 10/2010 |

OTHER PUBLICATIONS

Singh VK, Wu B, Nevatia R. Pedestrian tracking by associating tracklets using detection residuals. InMotion and video Computing, 2008. WMVC 2008. IEEE Workshop on Jan. 8, 2008 (pp. 1-8). IEEE. (Year: 2008).*

(Continued)

*Primary Examiner* — Clifford Hilaire
(74) *Attorney, Agent, or Firm* — Muncy, Geissler, Olds & Lowe, P.C.

(57) ABSTRACT

Method for monitoring individuals in a place equipped with cameras, the method including the steps of: detecting representative characteristics of an individual in a first zone of the place; detecting representative characteristics of an individual in at least a second zone and comparing these representative characteristics with representative characteristics previously stored in order to determine whether the individual detected in the second zone has been detected in other zones; confirming the determination from a topography of the place by checking consistency of a path of the individual from one zone to another and of the time model by comparing temporal detection information on the representative characteristics in the zones. Device for implementing this method.

13 Claims, 1 Drawing Sheet

(56) References Cited

OTHER PUBLICATIONS

Berclaz J, Fleuret F, Turetken E, Fua P. Multiple object tracking using k-shortest paths optimization. IEEE transactions on pattern analysis and machine intelligence. Sep. 2011;33(9):1806-19. (Year: 2011).*

Lovell BC, Bigdeli A, Mau S. Embedded face and biometric technologies for national and border security. InComputer Vision and Pattern Recognition Workshops (CVPRW), 2011 IEEE Computer Society Conference on Jun. 20, 2011 (pp. 117-122). IEEE. (Year: 2011).*

Fujimoto K, Scheeres DJ, Herzog J, Schildknecht T. Association of optical tracklets from a geosynchronous belt survey via the direct Bayesian admissible region approach. Advances in space research. Jan. 15, 2014;53(2):295-308. (Year: 2014).*

Omar Javed, et al, "Modeling inter-camera space-time and appearance relationships for tracking across non-overlapping views", *Computer Vision and Image Understanding*, Academic Press, US, vol. 109, No. 2, Jan. 10, 2008, pp. 146-162.

Vera Kettnaker, et al, "Bayesian Multi-camera Surveillance", Proceedings of the 1999 IEEE Computer Society Conference on Computer Vision and Pattern Recognition, Jun. 23-25, 1999, Fort Collins, Colorado, IEEE, The Institute of Electrical and Electronics Engineers, Inc., US, vol. 2, Jun. 23, 1999, pp. 253-259.

\* cited by examiner

METHOD AND DEVICE FOR MONITORING INDIVIDUALS IN A PLACE EQUIPPED WITH DISTRIBUTED DETECTION MEANS

BACKGROUND OF THE INVENTION

Field of the Invention

The present invention relates to the field of the monitoring of places such as transport terminals (airports, railway stations, ports), military sites, industrial sites, public places, etc.

Brief Discussion of the Related Art

Such places are usually equipped with a system of cameras connected to a monitoring station in which there is a server for recording images captured by the cameras and screens for displaying the images captured by the cameras. This enables operators monitoring the screens to be able to detect suspect behaviour and to use the recorded images to display a scene that has taken place in the past.

One of the advantages of having a system of cameras distributed in a place is that it makes it possible to follow the passage of individuals in the place. This however assumes that a sufficient number of operators are present in the monitoring station, all the more so when the place is heavily frequented.

BRIEF SUMMARY OF THE INVENTION

One aim of the invention is to provide a means for facilitating the monitoring of individuals in a place equipped with for example with cameras.

To this end, according to the invention, a method is provided for determining paths of individuals in a place having zones equipped with means for detecting individuals, and some of which are inaccessible directly from other zones, the detection means being connected to a computerised processing unit incorporating a topography of the place and a time model comparing a travel time and at least one possible path between the zones, the method comprising the steps of:
  storing in the computer unit initial events each associating a detection of the representative characteristics of an individual in a first zone and temporal detection information,
  listing in the computer unit subsequent events each associating a detection of representative characteristics of an individual in another one of the zones of the place and temporal detection information,
  reconstituting in the computer unit a path of each individual in the place from the first zone by aggregating events subsequent to each initial event by comparing representative characteristics of each subsequent event with representative characteristics of each initial event, and checking consistency of the paths of the individuals from one zone to another from the topography of the place, the time model and temporal detection information.

The first zone is here the first zone in which the representative characteristics of said at least one individual have been detected. As a result the first zone is not necessarily the same for all the individuals. The temporal detection information makes it possible to determine at what moment (hour, minute, second) the image in which the representative characteristics were detected was captured. When an individual is detected in a second zone, it is sought to recognise him, that is to say to determine whether he is one of the individuals previously detected in the first zone. This recognition is done by comparing representative characteristics detected in the second zone with the characteristics stored. During recognition, account is taken of the topography of the place, that is to say the possible paths between the zones, and the time that has elapsed between the detection of the representative characteristics in the first zone and the detection of the representative characteristics in the second zone (if the second zone is not physically reachable from the first zone in less than a predetermined time, an individual detected in the first zone can be situated in the second zone only once this time has elapsed). Taking into account the topography of the place and the time model reinforces the reliability of the recognition.

When at least one subsequent event, referred to as residual, has not been able to be aggregated in order to form a reconstituted path integrating it, the method comprises the subsequent steps of: identifying reconstituted paths considered to be incomplete from the topography of the place, determining a probability that the residual subsequent event follows the last subsequent event of each reconstituted path and aggregating the residual subsequent event with one of the reconstituted paths according to this probability.

This case presents itself for example when the zone of the residual subsequent event cannot in theory be reached without the individual having been detected in an intermediate zone situated between the zone of the residual subsequent event and the zone of the last subsequent event of each reconstituted path. It may in fact be that the detection did not function when the individual was passing through the intermediate zone, for example because the sensor was faulty at that moment, the individual was masked by another person or the individual did not enter the field of a mobile camera. The method of the invention makes it possible to take account of these situations. In particular, knowledge of the actual topography of the place makes it possible to detect, with certainty, incomplete paths and subsequently to attach residual subsequent events thereto.

Advantageously, during subsequent steps, from the topography, paths are sought that could lead an individual to the zone of the residual subsequent event starting from the zone of the last subsequent event of each reconstituted path and a density of probabilities is calculated for all these paths.

Another subject matter of the invention is a device for implementing this method.

Other features and advantages of the invention will emerge from a reading of the following description of particular non-limitative embodiments of the invention.

BRIEF DESCRIPTION OF THE DRAWINGS

Reference will be made to the accompanying drawings, among which.

DETAILED DISCUSSION OF THE PREFERRED EMBODIMENTS

Figure 1:
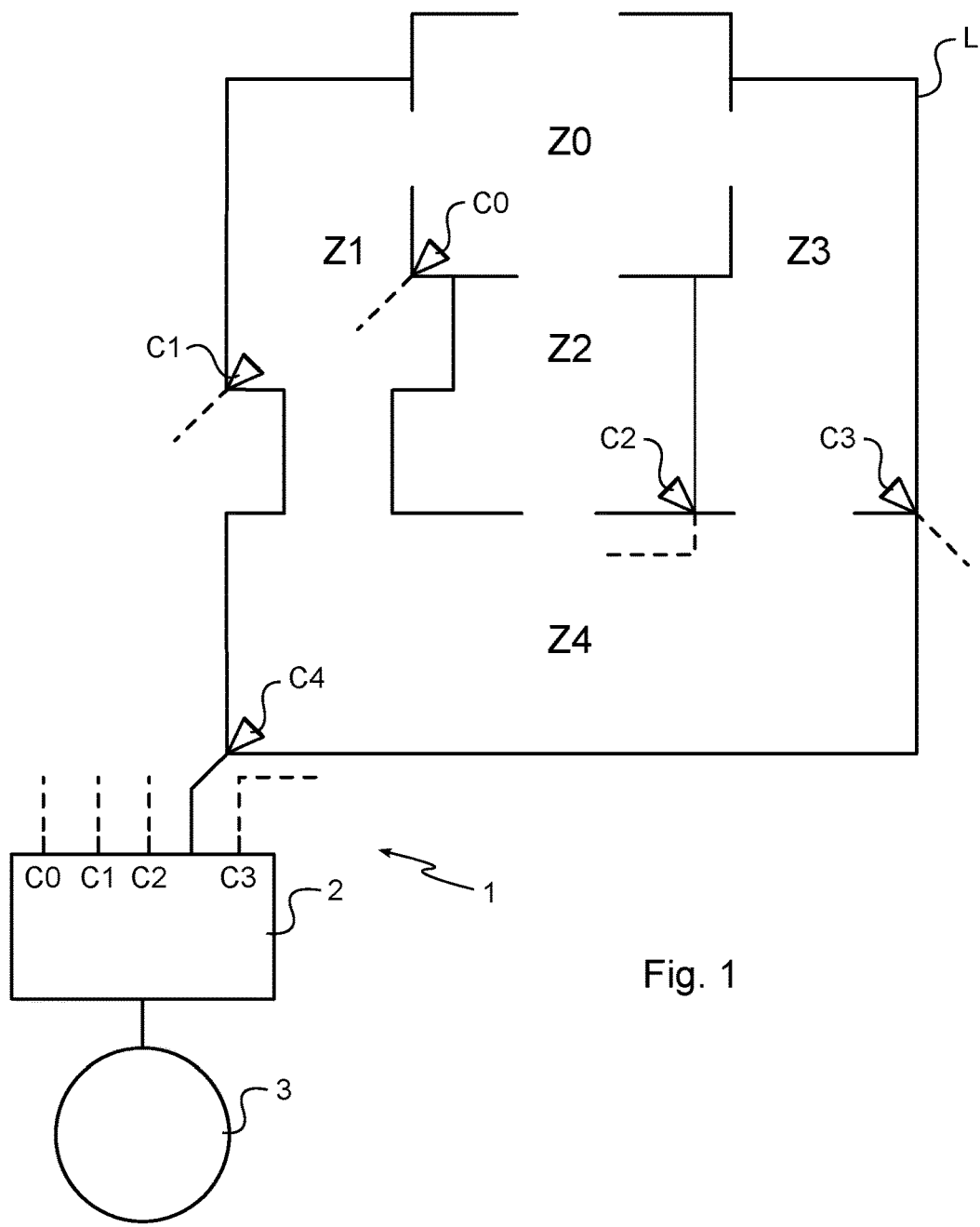
FIG. 1 is a schematic view of a place equipped with a monitoring device for implementing the invention.

With reference to the figures, the invention is here described in application to the monitoring of a place L, here in the form of a hangar, having zones Z0, Z1, Z2, Z3, Z4, forming halls in the place L. The zone Z0 is an entrance hall of the place L and the zone Z4 is the exit hall of the place L. The zone Z0 communicates with the zones Z1, Z2, Z3 on the one hand and with the outside of the place L on the other hand. The zone Z1 communicates with the zones Z0 and Z4. Zone Z2 communicates with the zones Z0 and Z4. Zone Z3 communicates with the zones Z0 and Z4. The zone Z4 communicates with the zone Z1, the zone Z2 and the zone Z3. It will be noted that: the zone Z4 is inaccessible directly from the zone Z0 and vice versa; the zone Z3 is inaccessible directly from the zone Z1 and vice versa.

Each of the zones Z0, Z1, Z2, Z3, Z4 is equipped with at least one camera C0, C1, C2, C3, C4 arranged so as to capture images of the individuals moving in the zones Z0, Z1, Z2, Z3, Z4, in images that are sufficiently defined so that it is possible to detect representative characteristics of the individuals situated on the images. These representative characteristics comprise for example garments, hairstyle, or any biometric characteristics, including in particular lines on the face. In the zone Z1, the camera C1 is preferably disposed close to the entrance, a reception desk or access control where any individual entering the place L is forced to pass and optionally to present at least one document certifying his identity or an access authorisation: it is then certain that there will be an image of any individual who has regularly entered the place L. In the same way, the camera C7 is preferably disposed close to the exit in order to capture images of any individual regularly leaving the place L.

The method of the invention is implemented by means of a monitoring device, generally designated as 1, comprising a computerised processing unit 2 that is connected to the cameras C0, C1, C2, C3, C4 and is arranged to process data transmitted by the cameras C0, C1, C2, C3, C4. The processing unit 2 has a memory 3 containing a topography of the place L (depicted schematically in FIG. 2) and a time model comparing average travel times and paths between the various zones Z0, Z1, Z2, Z3, Z4. The recorded topography is in accordance with the actual topography of the place and is recorded in advance in the processing unit and if necessary updated on isolated occasions or periodically. The time model is based for example on a Gaussian curve centred on a mean travel time over each path.

The processing unit executes a computer program for monitoring individuals. The program analyses the images captured by the cameras C0, C1, C2, C3, C4, images that are transmitted to it as they are captured.

For each zone, the program is arranged to detect, in the images that are transmitted to it, representative characteristics of each individual who is situated there and for storing these characteristics in association with temporal detection information, an identifier of the individual and an identifier of the zone. The temporal detection information makes it possible to determine at which moment (hour, minute, second) the image in which the representative characteristics were detected was captured. Before the storage of the representative characteristics, a recognition step is carried out, consisting of comparing these representative characteristics with representative characteristics previously stored in order to determine whether the individual detected in said zone was detected in other zones. The comparison is for example made by using biometric identification techniques, also referred to as matching techniques. A step of confirmation of the validation is also performed from a topography of the place by verifying consistency of a path of the individual from one zone to another and the time model by comparing the time information on detection of the representative characteristics in the zones. In the affirmative, the representative characteristics newly detected are recorded in association with the pre-existing identifier; in the negative, the newly detected representative characteristics are recorded in association with a new identifier chosen arbitrarily.

In theory, the identifiers are created for the individuals newly detected in the images captured in the zone Z0 (there is no entrance in the other zones) and the associated identifiers and data are deleted when the exiting of individuals through the zone Z4 is detected.

It is therefore possible to automatically follow an individual in his movements in the place L.

A particular example will now be described to illustrate the principle of the method (the individuals mentioned in the following example are not shown in the figure).

At a given moment, the memory contains the following data:
 identifier I1, with its representative characteristics and the temporal detection information in Z1 and Z0;
 identifier I2, with its representative characteristics and the temporal detection information in Z0, Z2;
 identifier I3, with its representative characteristics and the temporal detection information in Z0, Z3;
 identifier I4, with its representative characteristics and the temporal detection information in Z0.

An individual enters the zone Z0 and appears on the images captured by the camera C0. His representative characteristics are detected and compared with those stored. If none corresponds, the representative characteristics and the temporal detection information are stored in association with a new identifier I5. It should be noted that, in order to go more quickly during the comparison, it would have been possible to choose to use, for the comparison, the characteristics of the individuals last detected in the zone Z0 or a zone communicating with the zone Z0 (in the present simplified example all the individuals are concerned), the other individuals not being able to reach the zone Z0 directly from the zone in which they were last detected.

Let us imagine now that the representative characteristics of the individual I1 are similar to those of the individual I1 and those of the individual I3. On the images of the zone Z4, representative characteristics are detected that are compared with those stored. The comparison reveals a list of three possible results, namely I1, I3, I4, with a matching level for each. Confirmation is then proceeded with, from the topography of the place L, by checking consistency of a path of the individual from one zone to the other and the time model by comparing time information on detection of the representative characteristics in the zones. In this case:
 I1 was last situated in zone Z1,
 I3 was last situated in zone Z3, from which he can directly access zone Z4,
 I4 was last situated in zone Z0, from where he cannot directly access zone Z4.

A study of the topography of the place L makes it possible to reduce the probability that the representative characteristics detected in the zone Z4 belong to I4, or even to firmly reject this possibility.

The representative characteristics were detected in the zone Z4 at time t. The mean time for accessing the zone Z4 is 60 seconds from the zone Z1 and 30 seconds from the zone Z3 according to the time model. However, the representative characteristics of I1 were detected last in the zone Z1 at t−30 seconds and the representative characteristics of I3 were last detected in zone Z3 at t−45 seconds. Thus the probability that I1 was situated in zone Z4 at time t is lower than the probability that I3 was situated in zone Z4 at time t.

It will be noted that the method of the invention can be implemented in real time, as the images are captured and received by the processing unit, or in non-real time on the basis of previously stored images.

In detail, the method of the invention is implemented for determining paths of individuals in the place L and comprises the steps of:

- storing in the computer unit initial events each associating a detection of the representative characteristics of an individual in a first zone and temporal detection information,
- listing in the computer unit subsequent events each associating a detection of representative characteristics of an individual in another one of the zones of the place and temporal detection information,
- reconstituting in the computer unit a path of each individual in the place from the first zone by aggregating events subsequent to each initial event by comparing representative characteristics of each subsequent event with representative characteristics of each initial event, and checking consistency of the paths of the individuals from one zone to another from the topography of the place, the time model and temporal detection information.

Thus the computerised processing unit stores:

- for each initial event, the biometric characteristics of an individual detected in the zone Z0, an identifier allocated to this event (or to this individual) and temporal detection information (here the date and time of the detection);
- for each subsequent event, the biometric characteristics of an individual detected in one of zones Z1 to Z4 of the place L, an identifier allocated to this event and temporal detection information (here the date and time of the detection).

The paths of the individuals in the place L from the zone Z0 are reconstituted by an algorithm aggregating events subsequent to each initial event by:

- comparing the representative characteristics of each subsequent event with representative characteristics of each initial event, and
- checking consistency of the paths of the individuals from one zone to another from the topography of the place, the time model and temporal detection information.

To make the reconstitution, three probabilities that two events E1, E2 are connected to the same person are calculated:

- a biometric probability $p_{bio}(E_1, E_2)$ according to the similarity of the biometric characteristics,
- a topographic probability $p_{topo}(E_1, E_2)$ determined on the basis of the topography,
- a temporal probability $p_{time}(E_1, E_2)$ representing a probability distribution of times for passing between the two zones.

These probabilities are next used for calculating a global probability p that is equal to $P = (p_{bio}(E_1, E_2))^{\alpha} (p_{time}(E_1, E_2))^{\beta} (p_{topo}(E_1, E_2))^{\gamma}$ in which the exponents $\alpha$, $\beta$, $\gamma$ weight the probabilities with respect to one another.

The method is implemented in two stages.

In a first phase, the algorithm determines a matrix for associating the various events with each other in order to create paths and to identify the most probable paths.

In this matrix, each row represents for an event all the possible associations taking this event as a previous event and each of the events as a subsequent event.

In each cell on the row, 0 will be indicated when the two associated events are the same or the global probability p that the event can be associated with another event.

The algorithm chooses, in each row, the association having the greatest probability, this probability nevertheless having to be greater than a predetermined threshold in order to be considered to be true by the algorithm. The row and column at the intersection of which the selected probability is situated are then filled with zeros in order to signify that no other association having the same starting event and the same arrival event can be adopted. This is repeated until it is no longer possible to select cells.

In the absence of any detection problem, it is possible to aggregate the associated events in order to form reconstituted paths from an initial event for all the individuals whose representative characteristics were detected in the zone Z0.

On the other hand, in the case of a detection problem, it is possible that the subsequent events may not have been able to be aggregated with an initial event. There are then: complete reconstituted paths between zone Z0 and zone Z4; incomplete reconstituted paths from zone Z0 but with missing events; and subsequent events or associations of subsequent events not attached to an initial event. A residual subsequent event is then spoken of to designate a single event that has not been able to be aggregated in a path reconstituted from an initial event and a residual path to designate an association of subsequent events that have not been able to be aggregated in a path reconstituted from an initial event. Knowledge of the actual topography makes it possible to quickly and reliably detect residual and incomplete paths.

In a second phase, the algorithm then executes the subsequent steps of determining the probability p that the residual subsequent event, denoted $E_r$, follows the last subsequent event of each reconstituted path, denoted $E_t$, and aggregating the residual subsequent event $E_r$ with one of the reconstituted paths according to this probability. The concern here is with reconstituted paths that are incomplete, considering that no event is missing in the complete reconstituted paths.

The probability that the residual subsequent event follows the last subsequent event $E_t$ of a reconstituted path identified during the first phase to form a new reconstituted path c is the product of:

- the probability $P_{bio}$ that the representative characteristics of the subsequent event $E_t$ belong to the same individual as the representative characteristics of the residual subsequent event $E_r$,
- a probability $p_c^{topo}$ that an individual passes from the zone of the last subsequent event $E_t$ to the zone of the residual subsequent event $E_r$ without having been detected,
- a probability $p_c^T$ that an individual passes from the zone of the last subsequent event of the reconstituted path to the zone of the residual subsequent event in the time separating the time information of the last subsequent event $E_t$ and the time information of the residual subsequent event.

The probability $p_c^{topo}$ is the product of:

- a detection error probability $p_c^{FTA}$ that represents the probability that an individual follows the path c without being seen on a zone of this path knowing the detection error rate of the system (this rate is usually designated FTA and is fixed by the designers of the system as a compromise between the risk of not taking account of a detection and the risk of taking account of a false detection), a probability $p_c^{Flow}$ that an individual passes from the zone of the last subsequent event $E_t$ to the zone of the residual subsequent event $E_r$ taking account of a history of the reconstituted paths.

The probability $p_c^{Flow}$ is calculated as follows: $p_c^{FTA} = (p_{FTA})^{N_i}$ with $N_i$ the number of zones without an event on the path c. The probability $p_c^{Flow}$ is calculated according to the probabilities of passing from one capture place to another $p_{c_1 \to c_2}^t$ (for example for the probability of passage in front of the sensor C1 and then in front of the sensor C2), which is obtained by observing the flow of persons moving in the place through the past. This gives $p_c^{Flow} = \Pi_{i=0}^{n-1} p_{c_i \to c_{i+1}}^t$ ($C_i$ designating the sensor of index i). Finally, $p_c^{topo} = (p_c^{FTA})^\gamma (p_c^{Flow})^\delta$ is obtained where $\gamma$ and $\delta$ are exponents chosen to weight the relative importance of the probabilities $p_c^{FTA}$ and $p_c^{Flow}$ in calculating the probability $p_c^{topo}$.

For a path c comprising successive detections by the sensors C0, Ci and CN (i varying from 1 to N−1), it is possible to calculate the probability that an individual has travelled over it in a time t by means of the time model. The latter comprises time laws between each pair of zones that communicate with each other (and therefore each pair of sensors able to successively detect the same individual without passing through another sensor). We can combine them in order to create one law per path in fact: $p_c^{T=p} {}_{c_1 \to c_2}^{T} * \ldots * p_{c_{N-1} c_N}^T$ with * symbolising a convolution product.

The algorithm will then calculate the density of probability $p^g(E_t, E_r)$ that the events $E_t$, $E_r$ are linked having regard to the topography and the time model. The probability density is written: $p^g(E_t, E_r) = \Sigma_{c \in Ch(E_t, E_r)} p_c^T(E_t, E_r) p_c^{topo}$ with $Ch(E_t, E_r)$ all the paths $c = C_t \to C_2 \ldots C_{N-1} \to C_r$ between $E_t$ and $E_r$. Here the following will be calculated in reality:

$$p^g(E_t, E_r) = \sum_{c \in Ch(E_t, E_r)} p_c^g(E_t, E_r)$$

where $p_c^g(E_t, E_r) = (p_c^T(E_t, E_r))^\beta (p_c^{FTA})^\gamma (p_c^{Flow})^\delta$.

As there may be many paths between $E_t$ and $E_r$ (or even infinity in the case of a topography with a loop), the algorithm makes an approximation to accelerate the calculations. The approximation adopted here consists of ignoring paths with excessively low probabilities.

A threshold $\epsilon$ was selected such that any path for which $(p_c^{FTA})^\gamma (p_c^{Flow})^\delta < \epsilon$ is ignored. The threshold is chosen according to the required approximation and calculation capacities available to the monitoring device. As a result, if a path n is ignored by the algorithm, the same will apply to any path that would encompass the path n while extending it.

The algorithm executes the following routine for exploring all the possible paths between the two events and calculating the probability density $p^g(E_t, E_r)$:

1. If $E_t$ and $E_r$ are not linked in the topography, $p^g(E_t, E_r) = 0$, the algorithm stops the calculation and otherwise begins step 2.
2. Putting n:=0, $C_0 := C_t$ and $p^g(E_t, E_r) = 0$.
3. For all the sensors $C_{n+1}^P$ that can be reached from $C_n$ and leading to $C_r$:
   1. If $C_{n+1}^P \neq C_r$
      Calculating $(P_{C_0 \to \ldots \to C_{n+1}}^{FTA})^\gamma (P_{C_0 \to \ldots \to C}^{Flow})^\delta$
      If $(P_{C_0 \to \ldots \to C_{n+1}}^{FTA})^\gamma (P_{C_0 \to \ldots \to C_{n+1}}^{Flow})^\delta > \epsilon$, then putting n:=n+1 and $C_n := C_{n+1}^P$ and then repeating step 3.
      If not passing to $C_{n+1}^{P+1}$.
   2. If $C_{n+1}^P = C_r$
      Calculating
      $P_{C_0 \to \ldots \to c_{n+1}}^g(E_t, E_r) = (p_c^T(E_t, E_r))^\beta (p_c^{FTA})^\gamma (p_c^{Flow})^\delta$.
      If $P_{C_0 \to \ldots \to c_{n+1}}^g(E_t, E_r) > \epsilon$, then
      $p^g(E_t, E_r) := p^g(E_t, E_r) + P_{C_0 \to \ldots \to c_{n+1}}^g(E_t, E_r)$
      If $(p_c^t(E_t, E_r))^\beta (p_c^{FTA})^\gamma (p_c^{Flow})^\delta > \epsilon$, then putting n:=n+1 and $C_n := C_{n+1}^{P+1}$ and repeating step 3.
      Otherwise passing to $C_{n+1}^{P+1}$
4. Returning $p^g(E_t, E_r)$. End of routine when all the paths making it possible to reach $E_r$ from $E_t$ have been travelled over.

The algorithm can consequently calculate the probability $p_r^t$ that an identified path is linked to a residue from firstly the probability density $p^g(E_t, E_r)$ and secondly the probability $P_{bio}$. Thus, with each pair $E_t$, $E_r$, the algorithm associates a probability density $p_r^{t = (p_{bio})^\alpha} p^g(E_t, E_r)$.

The algorithm then uses the probabilities $p_r^t$ as follows:
1. Creating a table in which each row corresponds to a reconstituted path and each column to a residue and in which each cell contains the previously defined probability $p_r^t$.
2. Selecting the cell of maximum probability higher than a predetermined positive threshold and associating the reconstituted path and the residue of the selected cell in order to form a new reconstituted path.
3. If no cell can be selected, the process is interrupted. Otherwise the algorithm returns to step 1 above.

Figure 2:
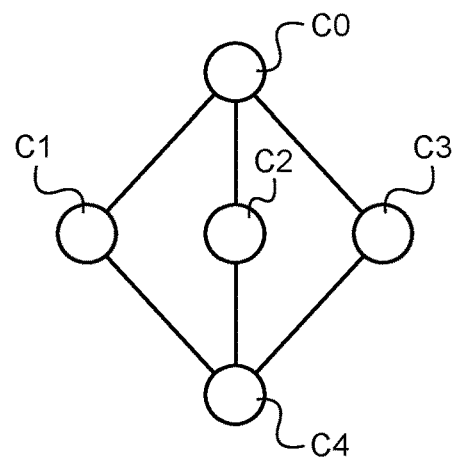
FIG. 2 is a view of a topography representing the place, which can be used for implementing the invention.

By way of numerical example, the second phase of the method of the invention is applied to the topography depicted in FIG. 2.

The following are chosen:
$\alpha = \beta = \gamma = \delta = 1$,
$\epsilon = 10^{-14}$,
$p_{FTA} = 5\%$.
The individual has taken 16 seconds to go from Z0 to Z4.
By hypothesis,
the time model provides that:

$p_{C0\ C1\ C4}^T(E_t, E_r) = p_{C0\ C2\ C4}^T(E_t, E_r) = p_{C0\ C3\ C4}^T(E_t, E_r) = 1.5 \times 10^{-6}$.

the flow laws provide that:

$p_{C0\ C1}^{topo} = p_{C0\ C2}^{topo} = p_{C0\ C3}^{topo} = 1/3$, $p_{C1\ C4}^{topo} = p_{C2\ C4}^{topo} = p_{C3\ C4}^{topo} = 1$.

At the start of the algorithm, the probability density $p^g(E_t, E_r) = 0$.

The calculation of the probability density in Z0 (sensor C0) is commenced and $p^g(C0) = 1$, that is to say greater than $\epsilon$. This path being of interest, the exploration routine is continued to zone Z1 in order to calculate the probability of the path Z0 to Z1.

This probability for the path Z0 to Z1 is equal to $(p_c^{FTA})^\gamma (p_c^{Flow})^\delta = 1/3 > \epsilon$.

As Z1 is not Z4 and the path is of interest, the exploration routine is continued to zone Z4 in order to calculate the probability of the path Z0 to Z1 to Z4 following the topography.

The following is finally arrived at $P_{C0 \to C1 \to C4}^g(E_t, E_r) = 1/3 \times 1 \times 1.15 \times 10^{-6} \times 0.05 = 1.9 \times 10^{-8}$.

Since this value is greater than $\epsilon$, the following is then calculated:

$p^g(E_t, E_r) = p^g(E_t, E_r) + P_{C0 \to C1 \to C4}^g(E_t, E_r) = 0 + 1.9 \times 10^{-8}$, that is to say $1.9 \times 10^{-8}$.

As it is not possible to loop back onto Z4, the algorithm goes back to Z1, where the only link is to Z4. The algorithm then goes back to Z0 and seeks a new path, which passes through Z2 then Z4. The probability for the path Z0 to Z2 is equal to $(p_c^{FTA})^\gamma (p_c^{Flux})^\delta = 1/3 > \epsilon$. The following is then calculated:

$$P_{C0 \to C2 \to C4}{}^g(E_p E_r) = 1/3 \times 1 \times 1.15 \times 10^{-6} \times 0.05 = 1.9 \times 10^{-8}.$$

which is greater than the threshold, and the following is calculated $$p^g(E_p E_r) = p^g(E_p E_r) + P_{C0 \to C1 \to C4}{}^g(E_p E_r) + P_{C0 \to C2 \to C4}{}^g(E_p E_r) = 3.8 \times 10^{-8}.$$

As before, it is not possible to loop back onto Z4, and the algorithm goes back to Z2, where the only link is to Z4. The algorithm then goes back to Z0 and seeks a new path, which passes through Z3 and then Z4. The probability for the path Z0 to Z3 is equal to $(p_c^{FTA})^\gamma (p_c^{Flow})^\delta = 1/3 > \epsilon$.

The following is then calculated:

$$P_{C0 \to C3 \to C4}{}^g(E_p E_r) = 1/3 \times 1 \times 1.15 \times 10^{-6} \times 0.05 = 1.9 \times 10^{-8}.$$

which is greater than the threshold, and the following is calculated $$p^g(E_p E_r) = p^g(E_p E_r) + P_{C0 \to C1 \to C4}{}^g(E_p E_r) + P_{C0 \to C2 \to C4}{}^g(E_p E_r) + P_{C0 \to C3 \to C4}{}^g(E_p E_r) = 5.7 \times 10^{-8}.$$

As all the paths have been explored, the routine is stopped and the probability density $p^g(E_p, E_r)$ is equal to $5.7 \times 10^{-8}$. This is what will be set out in the table.

Naturally the invention is not limited to the embodiments described but encompasses any variant falling within the field of the invention as defined by the claims.

In particular, the detection means may comprise other types of detector, such as a fingerprint sensor.

The identifier allocated here arbitrarily may, according to one variant, correspond to an identifier appearing in a document presented by the individual at the entrance to the place (identity of a document, boarding card or other access authorisation, etc.).

The time model may be based on a histogram produced from data acquired previously or any other law derived from prior historic data.

Although here the zones are physically separate from one another, the zones may not be partitioned. A zone then corresponds for example to the coverage zone of a camera.

The detection means may comprise a plurality of biometric sensors, the biometric sensors being of different types in order to capture biometric characteristics of different types with for example: a fingerprint detector and a face detector in an entrance zone, a fingerprint detector in one of the following zones and a face detector in another one of the following zones.

The invention claimed is:

1. A method for determining paths of individuals in a place having zones equipped with detection means for detecting individuals, and some of which are inaccessible directly from other zones, the detection means being connected to a computerised processing unit incorporating a topography of the place and a time model comparing a travel time and at least one possible path between the zones, the method comprising the steps of,
   storing in the computerised processing unit image data of initial events each associating a detection of representative characteristics of an individual in a first zone and temporal detection information, detection in the first zone is realized in the vicinity of an access control station in which each individual must present an identification document,
   listing in the computerised processing unit image data of subsequent events each associating a detection of representative characteristics of an individual in another one of the zones of the place and temporal detection information,
   reconstituting in the computerised processing unit a path of each individual in the place from the first zone by aggregating events subsequent to each initial event by comparing representative characteristics of each subsequent event with representative characteristics of each initial event, and checking consistency of the paths of the individuals from one zone to another from the topography of the place, the time model and temporal detection information,
   when at least one subsequent event, referred to as a residual subsequent event, has not been able to be aggregated in a path, the method comprises the subsequent steps of: identifying reconstituted paths considered to be incomplete from the topography of the place, determining a probability that the residual subsequent event follows a last subsequent event of each reconstituted path considered to be incomplete and aggregating the residual subsequent event with one of the reconstituted paths according to this probability,
   in which, during subsequent steps, from the topography, paths are sought that may lead an individual to the residual subsequent event starting from the last subsequent event of each reconstituted path and a probability density is calculated for all these paths.

2. A method according to claim 1, wherein the probability that the residual subsequent event follows the last subsequent event of one of the reconstituted paths considered to be incomplete for forming a new reconstituted path is a product of:
   a probability that the representative characteristics of the last subsequent event of the one of the reconstituted paths belong to the same individual as the representative characteristics of the residual subsequent event from a model of the representative characteristics,
   a probability that an individual passes from a zone of the last subsequent event of the one of the reconstituted paths to a zone of the residual subsequent event without having been detected in an intermediate zone.

3. A method according to claim 2, in which the product for calculating the probability that the residual subsequent event follows the last subsequent event of the one of the reconstituted paths also comprises a probability that an individual passes from the zone of the last subsequent event of the reconstituted path to the zone of the residual subsequent event in a time separating time information of the last subsequent event of the reconstituted path and the time information of the residual subsequent event.

4. A method according to claim 2, in which the probability that an individual passes from the zone of the last subsequent event of the reconstituted path to the zone of the residual subsequent event without having been detected is a product of:
   an error detection probability,
   a probability that an individual passes from the zone of the last subsequent event of the reconstituted path to a zone of the residual subsequent event taking account of a history of the reconstituted paths.

5. A method according to claim 1, in which, during subsequent steps, from the topography, paths are sought that may lead an individual to the residual subsequent event starting from the last subsequent event of each reconstituted path and a probability density is calculated for all these paths.

6. A method according to claim 5, in which a path is ignored if the probability that an individual takes this path to pass from the zone of the last subsequent event of the reconstituted path to the zone of the residual subsequent event taking account of a history of the reconstituted paths is below a predetermined threshold.

7. A method according to claim 1, in which the time model is based on a mean travel time over a path.

8. A method according to claim 1, in which the detection means comprises at least one biometric sensor.

9. A method according to claim 8, in which the detection means comprise a plurality of biometric sensors, the biometric sensors being of different types in order to capture biometric characteristics of different types.

10. A method according to claim 1, in which the detection means of the first zone are disposed in the vicinity of an access control station in which each individual must present an identification document.

11. A method according to claim 1, in which the representative characteristics detected in each zone are stored.

12. A monitoring device for monitoring individuals in a place having zones equipped with detection means for detecting individuals, and some of which are inaccessible directly from other zones, the monitoring device comprising a computerised processing unit that is connected to the detection means and is arranged to process data transmitted by the detection means, the computerised processing unit having a memory containing a topography of the place and a time model comparing a travel time and at least one path between the zones and executing a program implementing the method according to claim 1.

13. A method according to claim 1, wherein the detection means comprise cameras for capturing images of the individual moving in the zones, the representative characteristics of the individual being biometric characteristics extracted from said images.

* * * * *